Feb. 26, 1957 — B. W. WHITE ET AL — 2,782,467
FRICTION WINDOW SUPPORT
Filed Sept. 24, 1953

Ben W. White
Ben M. White
Johnny H. White
INVENTORS

BY Clarence A. O'Brien
and Harvey B. Jacobson
Attorneys

United States Patent Office 2,782,467
Patented Feb. 26, 1957

2,782,467
FRICTION WINDOW SUPPORT

Ben W. White, Ben M. White, and Johnny H. White, Blytheville, Ark.

Application September 24, 1953, Serial No. 382,102

3 Claims. (Cl. 20—52.4)

This invention relates to window construction and more particularly to a novel manner of supporting double-hung vertically sliding sash.

The primary object of this invention resides in the provision of a combined friction window support and weather-stripping which eliminates the necessity for weights and rope or chain for supporting the sliding sash in a desired position while also serving as weather-stripping for the sides of the window thereby substantially reducing the time and effort and cost of installation of vertically sliding sash.

The construction of this invention features pairs of channel-shaped members receiving strips of sponge or foam rubber therebetween which continually urge the channel-shaped members outwardly relative to each other to thereby frictionally hold vertically sliding sash in an adjusted position. Fasteners extend through the foam rubber stripping and through recess portions in one of the channel members and through apertures in the others of the channel members to thereby hold and secure the devices to the sash. However, the sponge or foam rubber strips urge one of each of the pairs of channel members into grooves in the window frame for frictional engagement therewith.

Still further objects and features of this invention reside in the provision of a friction window support that is strong and durable, simple in construction and manufacture, capable of being readily installed in various existing types of window structures, and which is relatively inexpensive to produce.

These, together with other objects and advantages which will become subsequently apparent reside in the details of construction and operation as more fully hereinafter described and claimed, reference being had to the accompanying drawings forming part hereof, wherein like numerals refer to like parts throughout, and in which:

Figure 1:
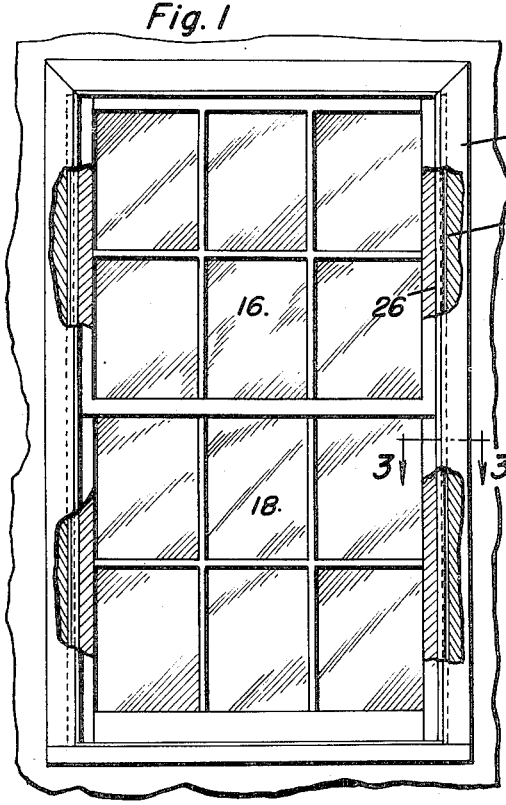
Figure 1 is a front elevational view showing the manner of installation of the friction window support with parts being broken away to show all the parts in greater detail.
Figure 2:
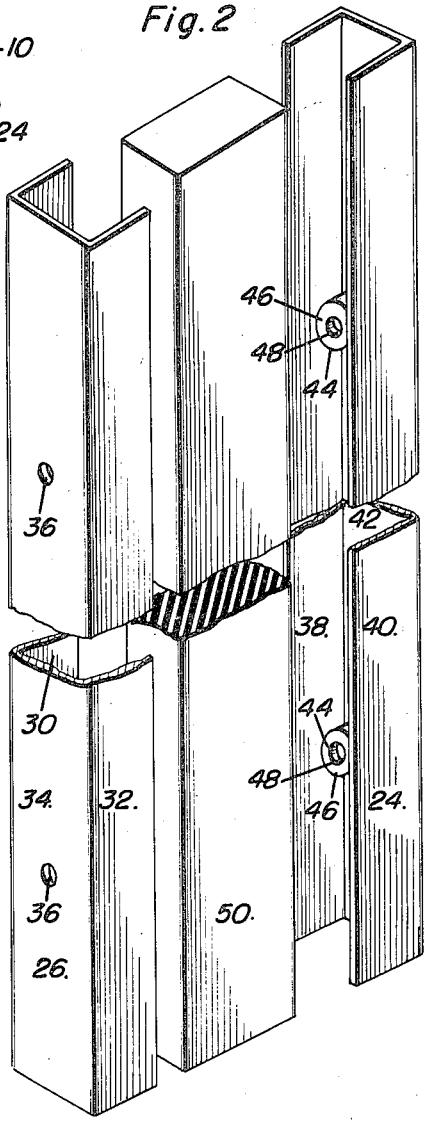
Figure 2 is an exploded perspective view illustrating the main elements of the friction window support in greatest detail.

With continuing reference to the accompanying drawings wherein like reference numerals designate similar parts throughout the various views, the reference numeral 10 generally designates a window frame of conventional construction adapted for receiving double-hung vertically sliding sash. The frame 10 is provided with spaced vertically extending grooves 12 and 14 in each of the vertically extending sides thereof.

The double-hung vertically sliding sash 16 and 18 are likewise provided with grooves 20 and 22 therein respectively on each of the vertically extending sides adapted to align with the grooves 12 and 14 in the frame 10.

Received within the aligned grooves 12 and 20 and 14 and 22 are telescoping pairs of channel-shaped members 24 and 26. The channel-shaped member 26 is provided with spaced leg portions 30 and 32 interconnected by a central connecting member 34 having apertures 36 therethrough. The channel member 26 is likewise provided with leg portions 38 and 40 adapted to seat within the leg portions 30 and 32 and is provided with a central connecting portion 42 having cylindrical recessed portions 44 extending inwardly in the direction of the leg portions 38 and 40 and terminating in end walls 46 forming shoulder surfaces, the end walls 46 being provided with holes 48 therethrough.

Elongated vertically extending strips 50 of foam rubber, sponge rubber or like material are received between the telescoping channel members 24 and 26.

Figure 3:
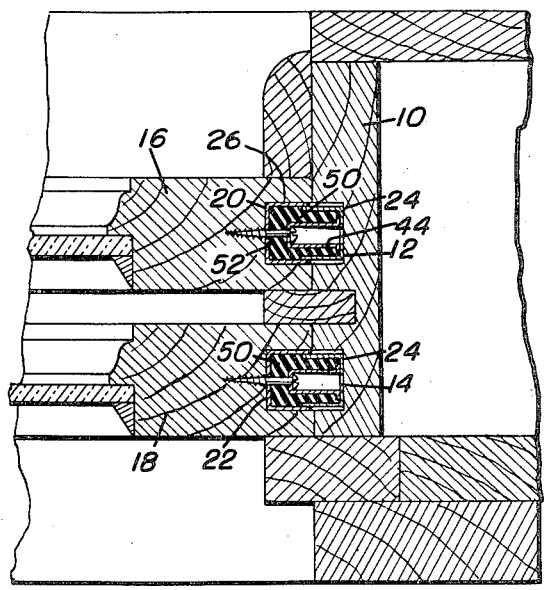
Figure 3 is an enlarged horizontal sectional view as taken along the plane of the line 3—3 in Figure 1.

Fasteners 52 which as shown best in Figure 3, comprise headed screws, extend through the holes 48, the strips 50 and the apertures 36 and are threadedly engaged in the sash 16 and 18. The strips 50 urge the channel members 24 outwardly and into the grooves 12 and 14, the channel members 24 being slidably carried by the fasteners 52. The shoulders 46 of the cylindrical recessed portions 44 are engaged by the heads of the fasteners 52 only when the strips 50 have urged the channel members 24 outwardly with the channel members 24 not confined within the grooves 12 and 14 since the grooves 12 and 14 are shallow enough to always permit the strips 50 to urge the channel members 24 into frictional engagement with the frame 10.

It is to be noted that the channel members 24 and 26 provide an effective weather-stripping of the vertical sides of the window thus necessitating only weather-stripping at the upper and lower portions of the window.

When it is desired to remove the sash from the window it is merely necessary to remove such of the blind stops as would interfere with removal and then to insert a bladed tool at the top of the sash after depressing a channel member 24 at one end thereof. Then, the blade may be slid down until the entire channel 24 has been pressed inwardly permitting the sash to be readily removed.

Since from the foregoing the construction and advantages of this friction window support are readily apparent, further description is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A combined friction type window support and weather-stripping for use in combination with a window frame and double-hung vertically sliding sash, said sash and said frame being provided with aligned grooves in the vertical edges thereof, said support comprising a plurality of pairs of horizontally telescoping opposed vertically extending channel members, a first of each of said channel members of said pairs of channel members having apertures therethrough, the other channel members of each of said pairs of channel members having recessed portions therein offset inwardly toward said first of said channel members, said recessed portions having holes therethrough in alignment with said apertures, strips of rubber-like material seated in and between said channel members of each of said pairs of channel members, and fasteners extending through said holes and said strips, and said apertures secured to said sash holding said first channel members in the grooves in said sash with said strips urging said other channel members into the grooves in said frame.

2. A combined friction type window support and weather-stripping for use in combination with a window frame and double-hung vertically sliding sash, said sash and said frame being provided with aligned grooves in the vertical edges thereof, said support comprising a plurality of pairs of horizontally telescoping opposed vertically extending channel members, a first of each of said channel members of said pairs of channel members having apertures therethrough, the other channel members having recessed portions therein offset inwardly toward said first of said channel members, said recessed portions having holes therethrough in alignment with said apertures, strips of rubber-like material seated in and between said channel members of each of said pairs of channel members, and fasteners extending through said holes and said strips, and said apertures secured to said sash holding said first channel members in the grooves in said sash with said strips urging said other channel members into the grooves in said frame, said other channel members being slidably carried by said fasteners, said fasteners having head portions engageable with shoulder surfaces on said recessed portions.

3. A combined friction type window support and weather-stripping for use in combination with a window frame and double-hung vertically sliding sash, said sash and said frame being provided with aligned grooves in the vertical edges thereof, said support comprising a plurality of pairs of horizontally telescoping opposed vertically extending channel members, a first of each of said channel members of said pairs of channel members having apertures therethrough, the other channel members of each of said pairs of channel members having recessed portions therein offset inwardly toward said first of said channel members, said recessed portions having holes therethrough in alignment with said apertures, strips of rubber-like material seated in and between said channel members of each of said pairs of channel members, and fasteners extending through said holes and said strips, and said apertures secured to said sash holding said first channel members in the grooves in said sash with said strips urging said other channel members into the grooves in said frame, said recessed portions being substantially cylindrical in shape having end walls forming shoulder surfaces engageable by said fasteners, said channel members being slidably carried by said fasteners.

References Cited in the file of this patent

UNITED STATES PATENTS

| | | |
|---|---|---|
| 2,288,558 | Vose | June 30, 1942 |
| 2,560,139 | Taxin | July 10, 1951 |